Feb. 10, 1970   H. B. WELK, JR., ET AL   3,494,257
FLUIDIC CONTROL SYSTEM AND FLUIDIC POSITION TRANSDUCER THEREFOR
Filed Sept. 19, 1967   2 Sheets-Sheet 1
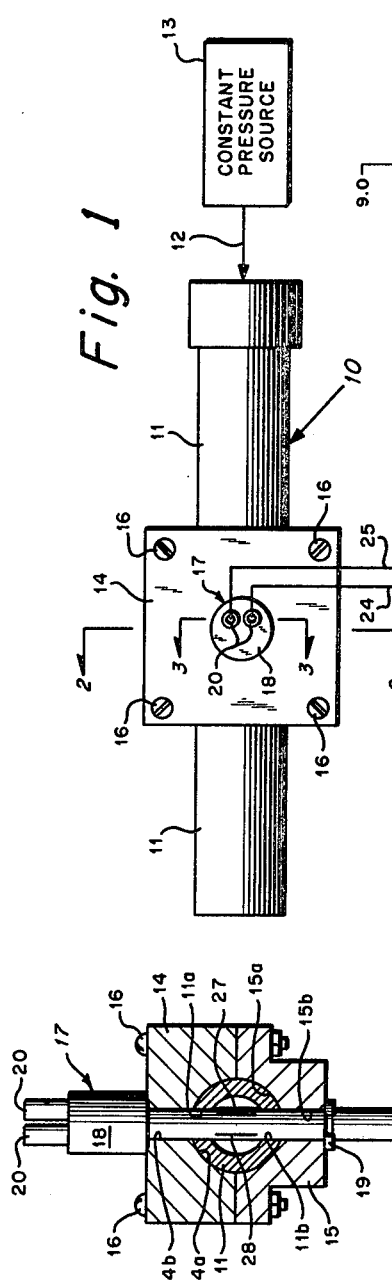
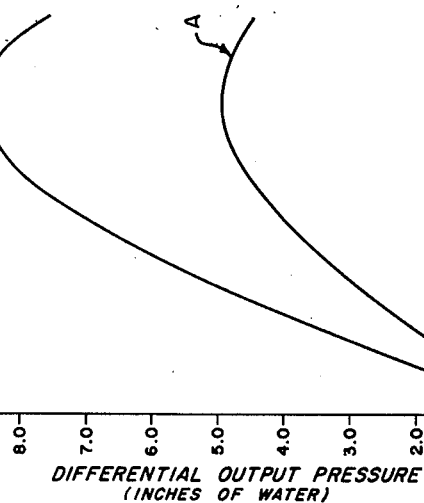
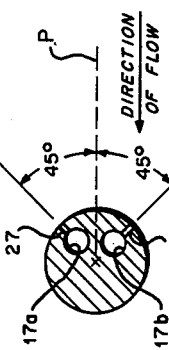
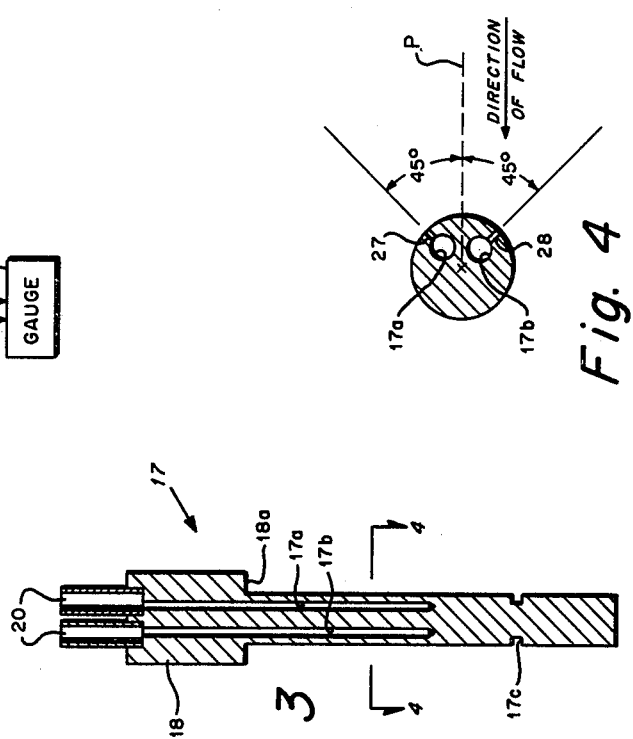
INVENTORS
HORACE B. WELK, JR.
ROBERT W. YOUNG
BY
ATTORNEYS

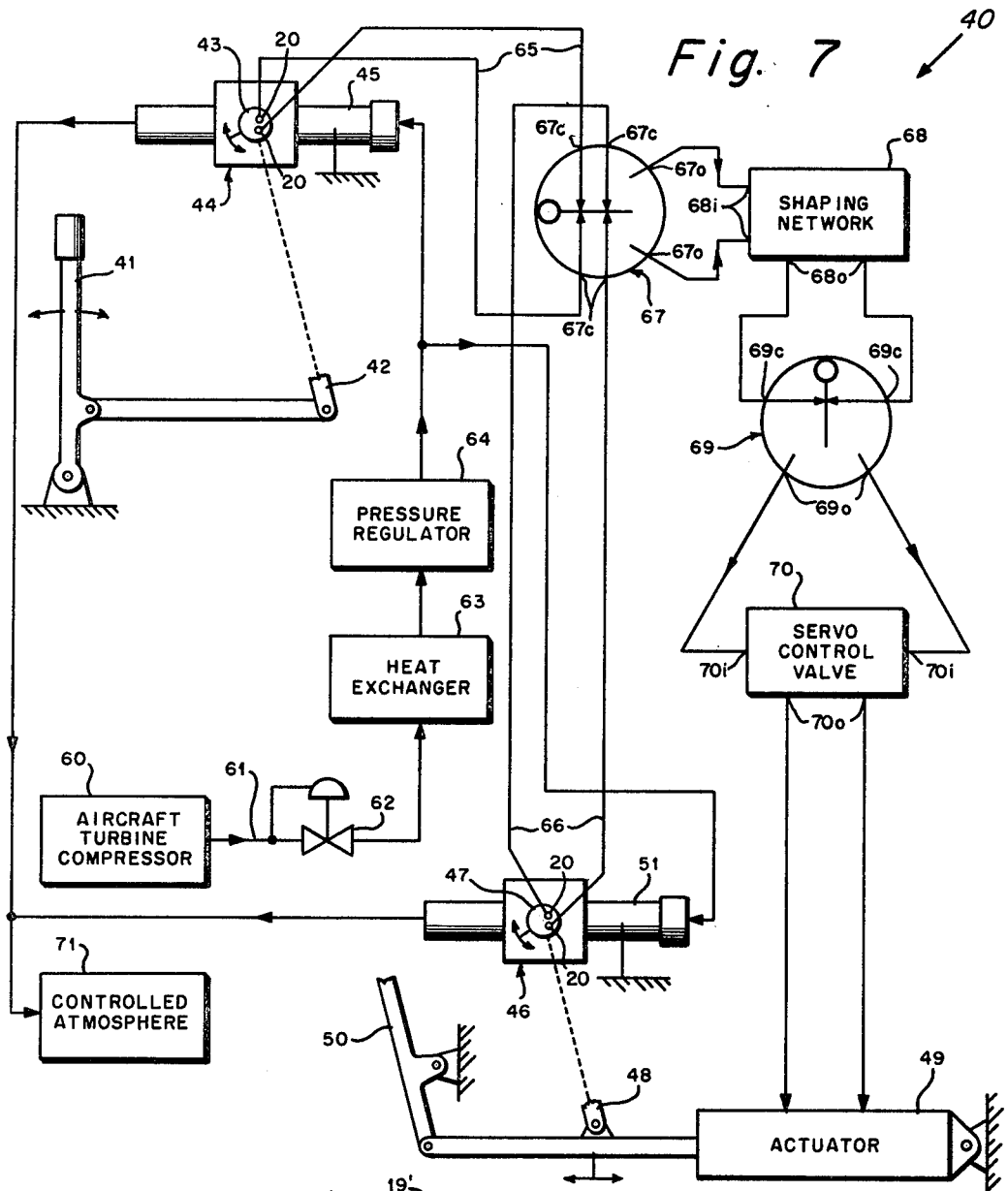

United States Patent Office 3,494,257
Patented Feb. 10, 1970

3,494,257
FLUIDIC CONTROL SYSTEM AND FLUIDIC POSITION TRANSDUCER THEREFOR
Horace B. Welk, Jr., Churchville, Pa., and Robert William Young, Farmington, Mich., assignors to the United States of America as represented by the Secretary of the Navy
Filed Sept. 19, 1967, Ser. No. 668,971
Int. Cl. F15b *13/16, 13/04*
U.S. Cl. 91—388                    5 Claims

ABSTRACT OF THE DISCLOSURE

A fluidic position transducer including a tube connected at one end to a constant pressure source and a rotatable probe which extends transversely across the tube and has a pair of longitudinal chambers each communicating with the tube interior through a respective one of parallel longitudinal slots and each connected to utilization apparatus. The differential pressure output signals of a pair of matched fluidic position transducers are fed to fluidic control elements including a flueric analog summing amplifier a flueric shaping network, a flueric amplifier and a servo control valve for enabling a mechanical control stick input signal applied to one of the transducers to cause a hydraulic actuator which is connected to the other transducer to correspondingly position an aircraft control surface.

STATEMENT OF GOVERNMENT INTEREST

The invention described herein may be manufactured and used by or for the Government of the United States of America for governmental purposes without the payment of any royalties thereon or therefor.

BACKGROUND OF INVENTION

The development of fluidic control systems, particularly those for aircraft, requires some sort of apparatus for providing pressure signals indicative of the physical position of certain elements which are actuated by the control system. The use of conventional electrical potentiometers is unsatisfactory in that the electrical output signal of a potentiometer is not directly compatible with fluidic circuitry and, therefore, an electrical to fluidic transducer would be needed. A simple fluidic position transducer can eliminate the need for electro-fluidic transducers.

SUMMARY OF INVENTION

It is a general purpose of the invention to provide a a fluidic control system including a position transducer which is not electrically powered, which directly provides a fluidic signal indicative of element position and whch is directly compatible with fluidic circuitry for controlling apparatus such as aircraft control surfaces. Briefly, this is accomplished by providing a position transducer including a tube connected at one end to a constant pressure source and a rotatable probe which communicates with the tube interior and provides a position responsive pressure signal to utilization apparatus. More particularly, the differential output signals of a pair of such transducers respectively linked to a mechanical input and a mechanical output are summed by a flueric summing amplifier in order to provide an error signal which is shaped and amplified and applied via a servo control valve to drive a mechanical output actuator.

BRIEF DESCRIPTION OF DRAWINGS

FIG. 1 is a partial block and schematic diagram including a representation of a longitudinal view of a fluidic position transducer interconnected between a pressure source and a gauge;

FIG. 2 represents a view in cross section of the transducer of FIG. 1 taken substantially along line 2—2;

FIG. 3 represents an enlarged view in cross section of a rotatable probe of the transducer of FIG. 1 taken substantially along line 3—3;

FIG. 4 represents a further enlarged view in cross section of a portion of the probe of FIG. 3 taken generally along line 4—4;

FIG. 5 represents a diagram showing the relationship of differential output pressure to probe rotational position at different constant input pressures;

FIG. 6 represents an isometric view with portions broken away of a modified form of probe for a fluidic position transducer; and FIG. 7 is a partial block and schematic diagram of an aircraft control system including a pair of fluidic position transducers.

DESCRIPTION OF PREFERRED EMBODIMENT

The position transducer generally designated 10 in FIG. 1 includes a cylindrical tube 11 having one end connected aircraft control system including a pair of fluidic position through a pressure line 12 to a constant pressure source 13 which supplies the transducer 10 with a fluid, compressible or incompressible, under pressure. As is more particularly shown in FIG. 2, a part of the tube 11 intermediate its ends is clamped between a pair of juxtaposed blocks 14 and 15 bolted together by bolts 16 and having opposed semicircular grooves 14a and 15a through which the tube 11 extends. The tube 11 includes formed therein a pair of diametrically opposed apertures 11a and 11b which register with a pair of coaxial bores 14b and 15b extending through the blocks 14 and 15 for receiving therethrough one end of a rotatable probe 17 which extends transversely across the interior of the tube 11. It is preferred that the probe 17 be spaced longitudinally along the tube 11 from its source connected end a sufficient distance so that the probe 17 will extend across a region of laminar fluid flow.

More particularly, referring to FIG. 3, the probe 17 includes extending from the other end thereof an integral shoulder portion 18 which abuts the block 14. A pair of bores 17a and 17b extend longitudinally through the shoulder portion 18 and into the probe 17 a sufficient distance so that the bores 17a and 17b extend substantially across the interior of the tube 11. A circumscribing groove 17c is formed in the probe 17 adjacent its one end and spaced from the block abutting surface 18a of the shoulder portion 18 a sufficient distance so that a tensioned split ring 19 may be received therewith to prevent withdrawal of the probe 17 from the blocks 14 and 15. A pair of connecting tubes 20 each are fixed to the shoulder portion 18 and extend from and communicate with a respective one of the bores 17a and 17b. The connecting tubes 20 are received within the ends of flexible tubing (not shown) which are connected to utilization apparatus as is generally indicated in FIG. 1 by the schematic pressure lines 24 and 25 which interconnect the probe 17 with a pressure gauge 26 such as a manometer.

The probe 17 includes a pair of longitudinal slots 27 and 28 which extend substantially across the interior of the tube 11 and communicate with respective ones of the bores 17a and 17b. As shown in FIG. 4 the slots 27 and 28 are both symmetrically spaced peripherally 45 degrees to either side of a reference plane P extending from the rotational axis of the probe 17. It is preferred that the length of the slots 27 and 28 be slightly less than the minimum spacing between the apertures 11a and 11b in order that there be no slot-contributed frictional binding between the probe 17 and the tube 11. Of course, the slots 27 and 28 must not extend beyond the tube 11.

Referring now to FIG. 4, if the probe 17 be rotated clockwise so that the reference plane P is acutely inclined relative to the direction of flow from the pressure connected end of the tube 11, a greater pressure will be developed at slot 27 than is developed at slot 28; and the probe 17 will provide a differential pressure output signal of some magnitude. As shown by the graph of FIG. 5 wherein curves A and B represent the differential pressures experimentally observed for various angles of probe deflection at respective input pressures of 2 p.s.i. and 4 p.s.i., greater pressure differentials are observed at greater angles of deflection of the probe reference plane P to either side of the direction of flow up to about 40 degrees. Of course, the greater pressure would be developed at slot 28 for counterclockwise probe rotation. Additionally, as shown by the curves A and B, greater input pressures from the pressure source 13 provide correspondingly greater differential pressures for a particular rotational position of the probe 17. The scale of the differential pressure gauge 26 to be used with a particular transducer 10 having a particular input pressure may be calibrated in degrees marked to either side of a zero point for indicating to a pilot the magnitude and direction of deflection of an aircraft control surface which is mechanically connected either to the probe 17 or the tube 11 to cause rotation of the probe 17 relative to the tube 11.

A suitable probe 17 of inexpensive construction may be easily fabricated. For example, the tube 11 may compise a 3¾ inch length of cylindrical aluminum tubing having inner and outer diameters of ¼ and 7/16 inch respectively. The probe 17 may be fabricated from cylindrical aluminum bar stock having a shoulder portion ¼ inch in diameter and a turned down cylindrical end portion of ⅛ inch extending therefrom which is to be inserted through the apertures 11a and 11b which are spaced 1½ inches inwardly of the exhaust end of the tube 11. The blocks 14 and 15 may be made from 7/16 inch segments of one inch square aluminum bar stock. The tubes 20 may be formed from lengths of 1/16 inch brass tubing and are force fitted into short bores which communicate with small bores 17a and 17b of the probe 17 formed as by drilling. The precisely spaced slots 27 and 28 which are to extend across the interior of the tube 11 may easily be formed by etching or by milling through the periphery of the smaller probe end to the bores 17a and 17b. Machining the transducer parts to relatively close tolerances eliminates the need for the use of gasket materials which otherwise might be included to reduce excessive pressure leakage.

Probe 17′, an alternative embodiment of rotatable probe for use in a fluidic position transducer such as 10, is shown in FIG. 6 wherein the probe 17′ which is to extend across a wind tunnel element such as the tube 11 (not shown) comprises a tube 30 sealed at its ends by caps 31 and 32 and having a diametrically and longitudinally extending partition 33 sweated thereinto which divides the interior of the tube 30 into two chambers. The peripherally spaced slots 27′ and 28′ longitudinally extend substantially across the interior of the tube or wind tunnel element with which the probe 17′ is to be used and provide communication with respective ones of the internal chambers of the tube 30. Each of a pair of opposed tubes 34 and 35 is fixed to and extends through a respective one of a pair of blocks 36 and 37 which clamp a diametrically apertured end of the tube 30 therebetween, the tubes 34 and 35 communicating with respective ones of the chambers formed by the partition 33. A split ring 19′ carried within a peripheral groove is used to prevent transverse slippage or withdrawal of the probe 17 from the tube 11.

The fluidic position transducer as described above may readily be incorporated into fluidic flight control systems. For example, in a control system 40 shown in FIG. 7, an aircraft control stick 41 is connected through a mechanical linkage 42 to the rotatable probe 43 of the position transducer 44 whose wind tunnel tube 45 is fixed relative to the aircraft. Similarly, a second position transducer 46 which is identical to the transducer 44 has its rotatable probe 47 connected by a mechanical linkage 48 to an actuator 49 which is to position an aircraft control surface 50 in accordance with deflection of the control stick 41, the wind tunnel tube 51 of the position transducer 46 being fixed relative to the aircraft. The linkages 42 and 48 have been schematically illustrated, and it is to be understood that the linkages 42 and 48 are to cause the rotatable probes 43 and 47 of the transducers 44 and 46 to undergo the same degree of rotational deflection relative to the respective tube 45 or 51 in response to a particular deflection of the control stick 41 for which is desired a corresponding deflection of the control surface 50 by the actuator 49.

A convenient source of constant pressure in an aircraft is bleed air from an aircraft turbine compressor 60. Gases of high temperature and high pressure from the compressor 60 are fed through an insulated supply line 61 and a pressure regulator including an on/off valve 62 to a heat exchanger 63 wherein the temperature and the pressure are decreased. The gases are then fed to a pressure regulator 64 which supplies the desired constant input pressure to the wind tunnel tubes 45 and 51 of the position transducers 44 and 46.

The differential pressure output signals from the probes 43 and 47 are each applied by a respective dual pressure line 65 and 66 connecting the connecting tube 2 of the probe 43 or 47 with a respective pair of opposed control ports of 67c of a flueric analog summing amplifier 67 whose differential pressure output signal appears as a difference in pressures at amplifier output ports 67o and represents the difference between the pressure differentials developed by the probes 43 and 47. The summing amplifier output signal or error signal is fed to the input ports 68i of a flueric shaping network 68 which shapes the error signal as a function of the dynamics of the load and provides at its output ports 68o a differential pressure signal applied to the control ports 68c of a flueric analog amplifier 69 which, in turn, provides an amplified differential error signal at its output ports 69o applied to servo control valve input ports 71i to drive a servo control valve 70. The output ports 70o of the servo control valve 70 are connected to enable the valve 70 to actuate the hydraulic actuator 49 to move both the control surface 50 and the transducer probe 47 through the linkage 48 in a direction so that the error signal of the amplifier 67 is reduced to zero.

Thus, when the probes 43 and 47 have the same positional relationships with respect to their respective wind tunnel tubes 45 and 51, the amplifier 67 provides no error signal which is amplified to drive the control valve 70. However, when the control stick 41 is deflected from its position, a corresponding change in the rotational position of the probe 43 occurs; and the amplifier 67 develops a corresponding error signal which causes the control valve 70 to cause the actuator 49 to accordingly reposition the control surface 50. As the control surface 50 reaches the desired corresponding position so that the probe 47 has the same relative rotational position as has the probe 43, the error signal from the summing amplifier 67 has been reduced to zero and further deflection of the surface 50 by the actuator 49 ceases.

Since the ambient pressure may significantly vary with changes in altitude it is preferred that the wind tunnel tubes 45 and 51 be exhausted into a controlled atmosphere 71 such as a container having a controlled constant pressure. It is to be noted, however, that if the transducers 44 and 46 are precisely matched, changes in input and output pressure thereto will not adversely effect the operation of the system since the differential pressure output signals of the probes 43 and 47, in effect, are interposed against each other by the summing amplifier 67.

From the above, a fluidic aircraft control system and inexpensive fluidic position transducers therefor have been provided which do not include electrical elements and which take up little space and add little weight to the aircraft. It is to be understood that the position transducers described are well suited for use in other indicating or control systems and can be used, as shown in FIG. 1, in combination with a pressure gauge 26 to sense and indicate the physical position of moveable elements such as an aircraft control surface.

What is claimed is:

1. In an aircraft having a control stick, a control surface, and hydraulic actuator means connected for actuating the control surface, a control system comprising:
   a source of constant pressure;
   first and second matched fluidic position transducers each including a tube connected at one end to said pressure source and a cylindrical probe element connected rotatably to said tube, extending across the interior thereof and having formed therein a pair of internal chambers communicating with the interior of said tube through respective peripherally spaced openings;
   first linkage means connected between the control stick and said first transducer for causing rotation of said probe relative to said tube in response to deflection of said control stick;
   second linkage means connected between the hydraulic actuator means and said second transducer for causing rotation of said probe relative to said tube;
   fluidic summing amplifier means having a plurality of pairs of opposed control ports for providing an error output signal;
   pressure line means interconnecting said pair of internal probe chambers of each of said transducers with a respective pair of said plurality of pairs of control ports;
   servo control valve means connected between said fluidic summing amplifier means and the actuator means and being responsive to said error output signal for driving the actuator in a direction to reduce the magnitude of said error signal.

2. A system according to claim 1 further including controlled atmosphere means connected to the other ends of said transducers tubes.

3. A system according to claim 1 wherein said fluidic summing amplifier means includes:
   a flueric summing amplifier having said pairs of control ports and having output ports;
   a flueric shaping network connected to said summing amplifier output ports for receiving the output signal thereof and shaping said signal in accordance with the dynamics of the load imposed thereon and providing a shaped output signal; and
   flueric amplifier means connected to receive said shaped output signal from said shaping network and connected for actuating said control valve means to drive said actuator.

4. A control system for enabling deflection of a first element to cause a deflection of a second element comprising:
   a source of constant pressure;
   first and second matched fluidic position transducers each including a tube connected at one end to said pressure source and a cylindrical probe element connected rotatably to said tube, extending across the interior thereof and having formed therein a pair of internal chambers communicating with the interior of said tube through respective peripherally spaced openings;
   first mechanical linkage means connected between the first element and said first transducer for causing rotation of said probe relative to said tube in response to the deflection of said first element;
   second mechanical linkage means connected between the second element and said second transducer for causing rotation of said probe relative to said tube in response to deflection of the second element;
   fluidic summing amplifier means having a plurality of pairs of opposed control ports for providing an error output signal;
   pressure line means interconnecting said pair of internal probe chambers of each of said transducers with a respective pair of said plurality of pairs of opposed control ports; and
   positioning means including servo valve control means connected to said flueric summing amplifier means for receiving said error signal and hydraulic actuator means connected to be controlled by said servo valve control means and connected to deflect the second element, said positioning means being responsive to said error output signal for driving the second element in a direction to reduce the magnitude of said error signal.

5. A system according to claim 4 further including control atmosphere means connected to the other ends of said transducer tubes.

References Cited

UNITED STATES PATENTS

| | | | |
|---|---|---|---|
| 3,171,330 | 3/1965 | McCombs | 91—388 |
| 3,386,343 | 6/1968 | Gray | 91—388 |

PAUL E. MASLOUSKY, Primary Examiner

U.S. Cl. X.R.

91—461; 137—81.5, 561